US009721012B1

(12) United States Patent
Jiang et al.

(10) Patent No.: US 9,721,012 B1
(45) Date of Patent: Aug. 1, 2017

(54) PROVIDING SOCIAL PRESENCE INFORMATION FOR CONTENT ITEMS

(71) Applicant: Google Inc., Mountain View, CA (US)

(72) Inventors: Chuan Jiang, Sunnyvale, CA (US); Shreyas Doshi, Mountain View, CA (US); Dani Suleman, Fremont, CA (US); Varouj Armen Chitilian, Hillsborough, CA (US); Daniel Aaron Shaffer, Palo Alto, CA (US); Lakshmi Kumar Dabbiru, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 408 days.

(21) Appl. No.: 14/187,159

(22) Filed: Feb. 21, 2014

Related U.S. Application Data

(60) Provisional application No. 61/768,287, filed on Feb. 22, 2013.

(51) Int. Cl.
*G06F 17/30* (2006.01)
(52) U.S. Cl.
CPC ............................. *G06F 17/30861* (2013.01)
(58) Field of Classification Search
USPC ........................................................ 707/749
See application file for complete search history.

(56) References Cited

U.S. PATENT DOCUMENTS

| 8,676,795 | B1* | 3/2014 | Durgin | G06F 17/30716 707/730 |
| 2013/0097144 | A1* | 4/2013 | Siamwalla | G06F 17/30699 707/706 |
| 2013/0282834 | A1* | 10/2013 | Dempski | G06Q 30/0201 709/206 |
| 2014/0188899 | A1* | 7/2014 | Whitnah | G06F 17/30646 707/749 |

* cited by examiner

*Primary Examiner* — Jay Morrison
(74) *Attorney, Agent, or Firm* — McDermott Will & Emery LLP

(57) ABSTRACT

A system and machine-implemented method for displaying social presence information associated with content, the method including identifying content being provided for display, determining an entity associated with the content, determining one or more social presence scores for the content based on social activity at one or more pages belonging to the entity at one or more social networking services, the social presence score being determined based on one or more indications of the quantity or quality of the social activity, determining, based on at least one score of the one or more social presence scores, whether the content should be annotated with social presence information regarding the social activity and providing the content and social presence information for display if it is determined that the content should be annotated with social presence information.

21 Claims, 4 Drawing Sheets

PROVIDING SOCIAL PRESENCE INFORMATION FOR CONTENT ITEMS

CROSS-REFERENCE TO RELATED APPLICATION

The present application claims the benefit of U.S. Provisional Patent Application Ser. No. 61/768,287, entitled "Providing Social Presence Information for Content Items," filed on Feb. 22, 2013, which is hereby incorporated by reference in its entirety for all purposes.

BACKGROUND

Search results and/or advertisement content or sponsored content (hereinafter generally referred to as "Ads") may be accompanied by a social presence annotation, highlighting the social media presence of the content sponsor (e.g., content owner, advertiser). For example, where the content sponsor is associated with one or more social networking pages, the annotation may provide information regarding the social media presence of the content sponsor. To provide both the user and the content sponsor (e.g., advertiser) with the most benefit from such information being displayed, the social presence annotation should contain high quality, relevant and useful content for the user.

SUMMARY

The disclosed subject matter relates to computer-implemented method for displaying social presence information associated with content, the method comprising identifying content being provided for display. The method further comprises determining an entity associated with the content. The method further comprises determining one or more social presence scores for the content based on social activity at one or more pages belonging to the entity at one or more social networking services, the social presence score being determined based on one or more indications of the quantity or quality of the social activity. The method further comprises determining, based on at least one score of the one or more social presence scores, whether the content should be annotated with social presence information regarding the social activity. The method further comprises providing the content and social presence information for display if it is determined that the content should be annotated with social presence information.

The disclosed subject matter also relates to a system for displaying social presence information associated with content, the system comprising one or more processors and a machine-readable medium comprising instructions stored therein, which when executed by the processors, cause the processors to perform operations comprising identifying one or more content items being provided for display, each of the one or more content items being associated with an entity. The operations further comprise, for each of the one or more content items, determining one or more social presence scores based on social activity at one or more pages at one or more social networking services belonging to the entity associated with the content. The operations further comprise, determining, for each of the one or more content items, based on at least one score of the one or more social presence scores for the one or more content items, whether social presence information regarding the social activity relating to the content item should be provided for display. The operations further comprise, providing social presence information for each of the one or more content items, when it is determined that determined social presence information regarding the social activity relating to the content item should be provided for display.

The disclosed subject matter also relates to a machine-readable medium comprising instructions stored therein, which when executed by a machine, cause the machine to perform operations comprising identifying content being provided for display. The operations further comprise, determining an entity associated with the content. The operations further comprise, identifying social activity with regard to the content at one or more pages belonging to the entity at one or more social networking services, wherein the social activity includes posts and social interactions by the entity. The operations further comprise, determining one or more indication of quality of the social activity, wherein the one or more indications of the quality of the social activity comprise quality of the posts and social interactions by the entity, the relevance of the post and social interactions by the entity to the content or the relevance of the post and social interactions by the entity to a user query relating to the content. The operations further comprise, determining one or more indication of quantity of the social activity, wherein the one or more indications of the quantity of the social activity comprise one or more of a number of users following the entity, social activity of users with respect to the entity, frequency of the posts by the entity, the entity level of engagement, the entity level of interaction with other users, the entity level of responsiveness to other users, or entity popularity on social networking and search services. The operations further comprise, determining one or more social presence scores for the content based on one or both of the one or more indications of quantity of the social activity or the one or more indication of quality of the social activity. The operations further comprise, determining, at least based on the one or more social presence scores, whether the content should be annotated with one or more social presence information regarding the social activity. The operations further comprise, determining, at least based on the one or more social presence scores, whether social presence information should be highlighted. The operations further comprise, annotating the content with social presence information if it is determined that the content should be annotated with social presence information, wherein social presence information is presented in a visually differentiating manner if it is determined that social presence information should be highlighted.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
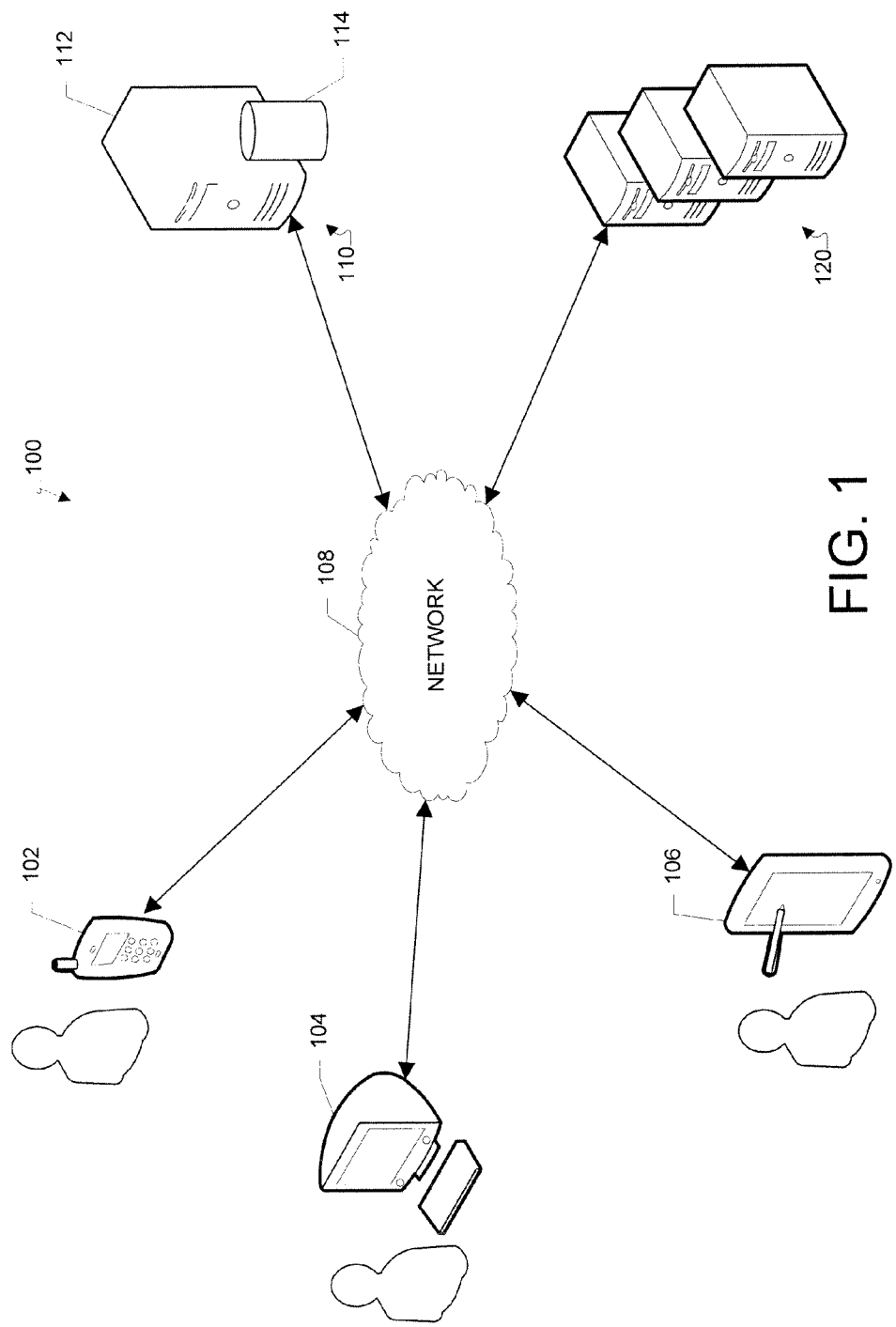
FIG. 1 illustrates an example client-server network environment, which provides for automatically determining whether to display and/or highlight social presence annotations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Social networking services may allow an entity (e.g., a business) to create one or more social networking profile(s) and/or page(s) (hereinafter generally referred to as a "social networking page"). The social networking page as described herein may include more than one page or profile associated with the same or multiple social networking accounts, across one or more social networking services. Any mention of social networking page is not limited to any single page, account or social networking service and generally refers to any social networking pages, accounts or social networking services associated with, owned, controlled, operated and/or contributed to by the content sponsor. The social networking page(s) represents the entity (e.g., business or organization) and enables the entity to post content at one or more social networking services.

The phrase "social networking service" as used herein encompasses its plain and ordinary meaning, including, but not limited to, an online service, platform or site that focuses on building and reflecting of social associations among users. Users of the social networking services may create associations with one another. These associations may include two sided or one sided associations, and may include subscriptions to a page associated with an entity. For example, one or more users of the social networking service may subscribe to the page of the entity at one or more social networking services (e.g., by subscribing to the entity), and/or may endorse the entity (e.g., by indicating a preference for the entity). These associations may be stored within a social graph at each social networking service (e.g., maintained at remote server(s) 120). Such user associations may be defined on a user-to-user basis, or as a group of users associated through membership within a group.

Users of social networking sites may generate various content, referred to herein as "posts". Posts may include various content shared at a social networking service, including but not limited to original content and/or existing content reshared at the social networking site.

The activity and associations of the entity at the one or more social networking services may be generally referred to as the entity's "social presence." Social presence may be defined in terms of social presence information and indicators including the number of users that are associated with the entity at the one or more social networking services (e.g., followers, contacts, etc.), the number of users that endorse the entity at the social networking service, content posted by the entity and/or one or more users in association with the entity including both original content and content related to the post, including comments, suggestions, tags, links to external content at one or more other pages, and similar auxiliary content, and other similar information.

When an entity or content belonging to the entity is associated with one or more social networking pages (e.g., at one or more social networking services), information regarding the social presence of the entity may be determined at the one or more social networking services, and may be presented along with content regarding the entity. For example, content associated with the entity (e.g., advertisements, sponsored content, articles, product descriptions) may be displayed to a user in response to a search query. When content regarding the entity is retrieved in response to the search query (e.g., as an advertisement or search result), the content may be annotated with social presence information regarding the entity. The social presence information may include information regarding the social activity and associations of the entity. The social presence information may be general (e.g., covers all information regarding the entity) or may be personalized for the user viewing the content (e.g., limited to the actions of the user or friends of the user with respect to the entity). In one example, social presence annotations may be enabled or disabled manually at the discretion of the advertiser or by the system manually according to simple signals such as number of associations or endorsements.

The subject disclosure provides a system and method for automatically determining whether to annotate content associated with an entity with social presence information. The determination includes automatically determining whether the social presence information is useful and beneficial to the entity (e.g., content sponsor) and/or the user viewing the content. When content is retrieved, a social presence score may be calculated for the social presence of the entity associated with the content (e.g., the content sponsor, owner, advertiser).

The score may be calculated based on the associations and social activity of the entity at the one or more social networking services. The entity, may, in some implementations, associate the content with one or more pages at one or more social networking services. In other examples, the social networking pages associated with an entity may be identified and associated with the content. For example, information regarding an entity including the social pages associated with that entity may be stored in an entity profile. When the content is determined to be associated with the entity, one or more of the social pages associated with the entity may be associated with the content. The content of these pages may be analyzed to derive social presence information used to calculate one or more social presence scores for the entity. In one example, a data store may store content relating to pages associated with a specific content, or entity, including the posts by the entity, comments by the entity, associations of the entity, user social activity with respect to the entity, and other similar information and content regarding the social presence of the entity.

In one example, one or more social presence criteria are used to calculate the score for the entity. These criteria may include the number of users following the entity, social activity of users with respect to the entity (e.g., endorsements, ratings, reviews), frequency of the posts by the entity (e.g., private and/or public posts), quality of the posts and interactions and the relevance to the content and/or the product they represent (e.g., relevance to the query, the entity generally, and/or the entity products or services) including topic analysis and spam analysis of entity posts and interactions, the entity level of engagement at the social networking service and/or with respect to their posts, the level of entity interaction with other users, the entity level of responsiveness to other users at the social networking service (e.g., those users posting or commenting regarding the entity), and/or entity popularity on social and search platforms and/or services.

Based on the presence criteria, which indicates the quality and quantity of social interaction and activity of the entity and users associated with the entity at the social networking service, one or more scores are generated for the entity and/or content. The score(s) may be general for the entity, or may be customized based on the content being presented (e.g., what the content includes) and/or the search query that led to the retrieval of the content. Based on the score(s) for the content individually and/or in comparison with score(s) for other content being displayed to the user, a determination is made as to whether to show, highlight or disable the social presence annotation.

In one example, a first cumulative social presence score is calculated for the content based on one or more of the criteria described above. In some implementations, the cumulative social presence score is compared to a threshold score (e.g., a predefined score limit) to determine whether the social presence annotation should be displayed. Furthermore, in some instances (e.g., once the cumulative social presence score meets the threshold score), one or more other content being provided for display along with the content are identified. A cumulative social presence score is also determined for each of the one or more other content and compared to the cumulative social presence score for the content. The comparison may further provide an indication of whether to display, highlight or disable social presence indications for the content and one or more other contents. For example, where more than one content is being displayed, the quality of the social presence of the other content may be important in determining whether the display of the social presence annotation for the content would be beneficial to the user and/or the entity.

In addition, one or more specific social presence scores or indications may also be determined for the content. The scores or indications may provide indications regarding specific social interaction or activity of the entity associated with the content. In one example, the individual scores or indications, either alone or in comparison to the corresponding scores or indications for other content being displayed, may provide an indication of whether the social presence annotations are disabled, displayed or highlighted and/or what is displayed or highlighted. For example, if a score or indication for a content associated with an entity indicates that the entity has a high number of followers, is extremely responsive or active or otherwise is socially active in a manner that stands out (e.g., either individually based on set thresholds and/or in comparison to the other content), the individual social activity that stands out may be displayed or highlighted within the social presence annotation.

In this manner, the social presence information provided and/or highlighted for display to the user, is social presence information associated with entities that have high-quality social presence.

FIG. 1 illustrates an example client-server network environment, which provides for automatically determining whether to display and/or highlight social presence annotations. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate automatically determining whether to display and/or highlight social presence annotations for content being provided for display to users interacting with electronic devices 102, 104, 106. Server 110 may further be in communication with remote servers 120 either through the network 108 or through another network or communication means.

According to some aspects, remote servers 120 can be any system or device having a processor, a memory and communications capability for hosting various remote social networking services and/or websites and web pages. Remote servers 120 may be further capable of maintaining social graphs for users and/or entities. The remote social networking services hosted on the remote server 120 may enable users and/or entities to create a profile and associate themselves with other users and/or entities at a remote social networking service. The remote servers 120 may further facilitate the generation and maintenance of a social graph including the created associations. The social graphs may include, for example, a list of all users and/or entity of a social networking service and their associations with other users and/or entities of the social networking service.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through the HTTP communication protocol. Other communication protocols may also be facilitated including for example, XMPP communication, for some or all communications between the client devices 102, 104, 106, server 110 and one or more remote servers 120 (e.g., through network 108).

Users may interact with the system hosted by server 110, and/or one or more social networking services hosted by remote servers 120, through a client application installed at the electronic devices 102, 104, 106. Alternatively, the user may interact with the system and the one or more social networking services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
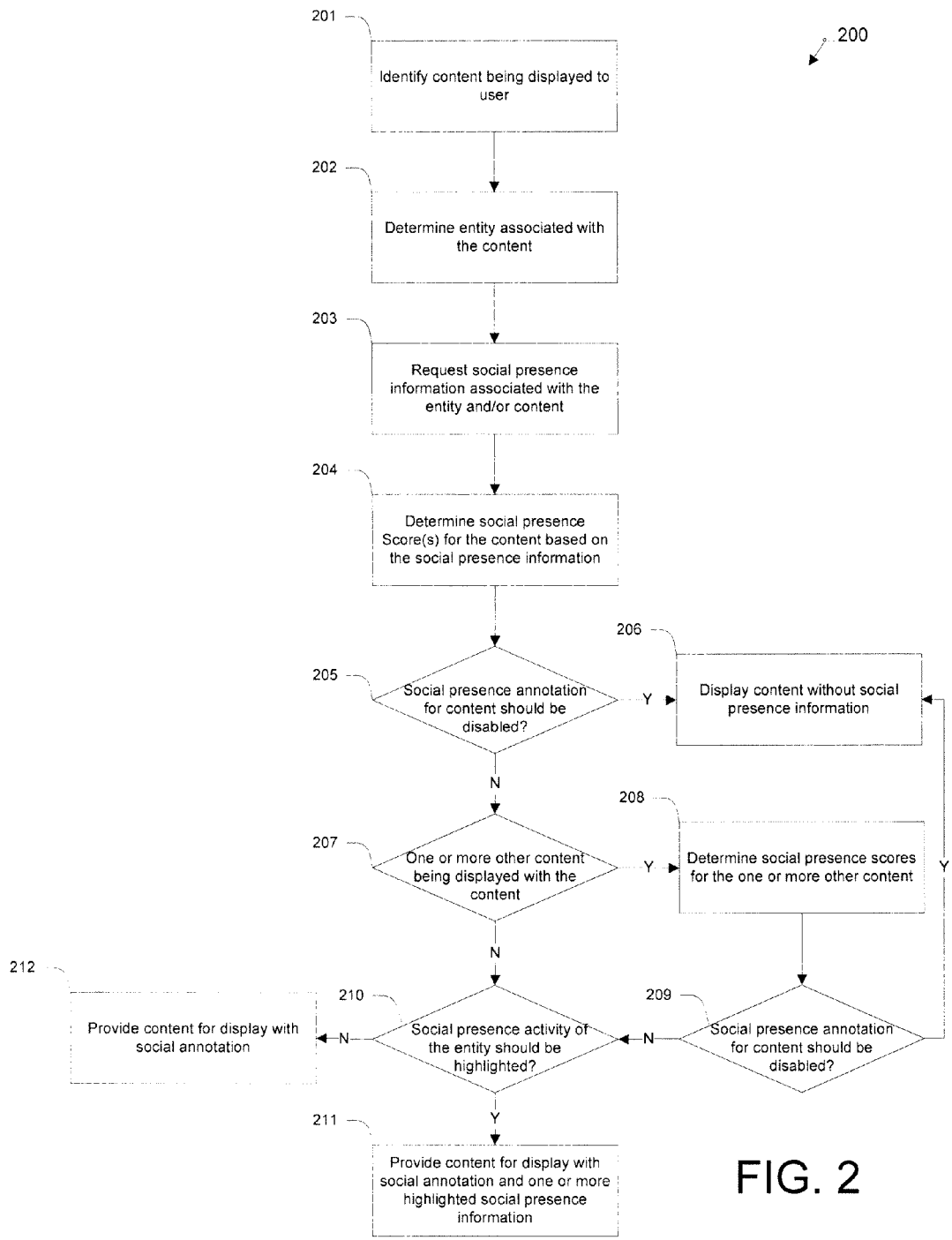
FIG. 2 illustrates a flow diagram of an example process 200 for determining if social presence information relating to content should be displayed and/or highlighted in association with the content.

FIG. 2 illustrates a flow diagram of an example process 200 for determining if social presence information relating to content should be displayed and/or highlighted in association with the content. In step 201, content being provided for display to the user is identified. In one example, the content may include advertisements or sponsored content. In step 202, an entity associated with the content is determined. The entity associated with the content may for example be a content sponsor, content owner, advertiser or other entity having control over the content and/or having an interest in how the content is presented to users (e.g., a financial incentive).

In step 203, social presence information regarding the entity and/or content is requested. The social presence information may be received and used to calculate one or more social presence scores and/or indications for the content in step 204. In some implementations, one or more of the social presence scores and/or indications are determined at the social networking services (e.g., hosted at server 120) and provided to the local system (e.g., at the client device and/or hosted at server 110). In another example, the social presence information is retrieved from the social networking service(s) hosting the pages associated with the entity and the score is calculated locally.

In step 205, based on the social presence score(s) and/or indication(s) it is determined if the social presence annotation regarding the content should be disabled (e.g., not displayed). The determination may be made based on a threshold score (e.g., social presence annotations are only provided for content having presence scores higher than a threshold score). If, in step 205, it is determined that the social presence annotation should be disabled, in step 206, the content is provided for display without a social presence annotation.

Otherwise, in step 207, it is determined if one or more other content are also being provided for display along with the content. If so, the process continues to step 210. Otherwise, in step 208, social presence score(s) and/or indication(s) for the one or more other content is determined (e.g., in a similar manner as the score(s) and/or indication(s) determined for the content in steps 203 and 204).

In step 209, it is determined if the social presence annotation for the content should be disabled based on comparing the score(s) and/or indication(s) for the content to score(s) and/or indication(s) for the one or more other content (e.g., do the score(s) and/or indication(s) of the content meet a specific relationship with regard to score(s) and/or indication(s) of the other content). If so, in step 209, it is determined that the social presence annotation should be disabled, in step 206, the content is provided for display without a social presence annotation. Otherwise, the process continues to step 210.

In step 210, based on one or more of score(s) and/or indication(s) of the content and/or one or more other content, it is determined if one or more social presence information and/or characteristics of the content should be highlighted (e.g., based on a pre-defined threshold or relationship to other content social presence score(s) and/or indication(s)). If so, in step 211, the content is provided for display with one or more social presence characteristics of the content being highlighted. Highlighting of the social presence information and/or characteristics may include providing a specific phrase that points out the significance of the social presence characteristic being highlighted, providing a special icon or representation for display with the social presence information, visually presenting the social presence information and/or the specific characteristic(s) being highlighted in a differentiating manner, or other methods that may bring attention to the social presence information and/or characteristics being highlighted.

Otherwise, if it is determined, in step 210, that no social presence information and/or characteristics should be highlighted, in step 212, the content is provided for display including a social presence annotation without highlighting.

Figure 3:
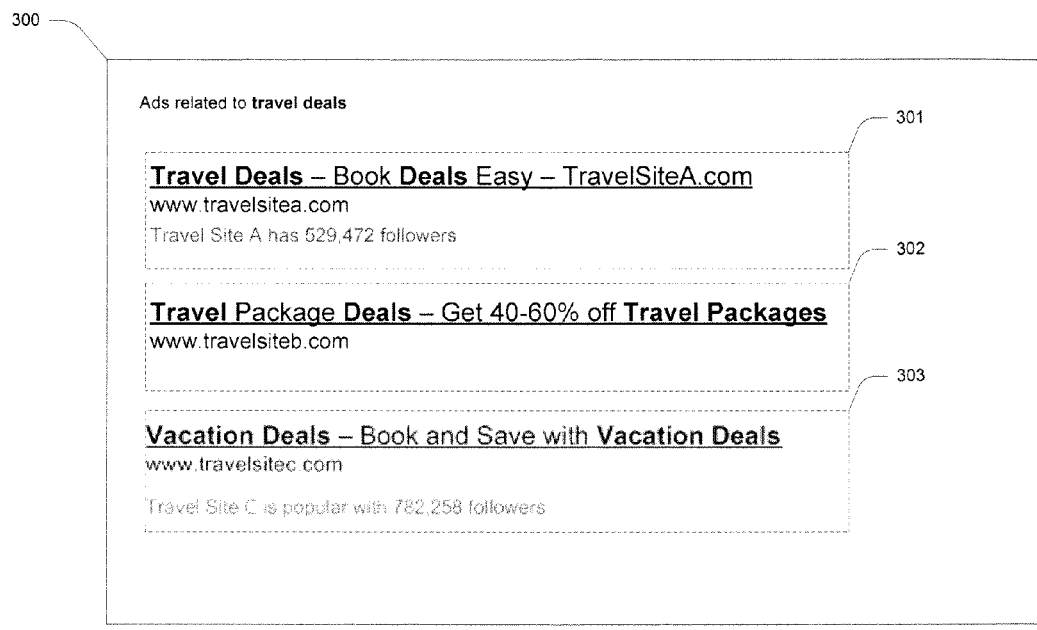
FIG. 3 illustrates an example graphical user interface 300 displaying one or more content items having social presence annotations that are displayed, highlighted and/or disabled according to the social presence quality of the entity associated with the content.

FIG. 3 illustrates an example graphical user interface 300 displaying one or more content items having social presence annotations that are displayed, highlighted and/or disabled according to the social presence quality of the entity associated with the content. User interface 300 is displaying three ads relating to a search query "travel deals". A first ad 301 is displayed with a social presence annotation indicating the number of followers of the "travel site a", which is the entity associated with the ad 301. The social presence annotation of ad 301 does not include any highlighted social presence information. A second ad 302 is displayed with the social presence annotation being disabled. A third ad 303 is displayed with a social presence indicating the number of followers of "travel site c", the entity associated with the ad 303. The social presence information regarding the number of followers associated with ad 303 is highlighted by pointing out the significance of having a high number of followers using the phrase "popular".

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
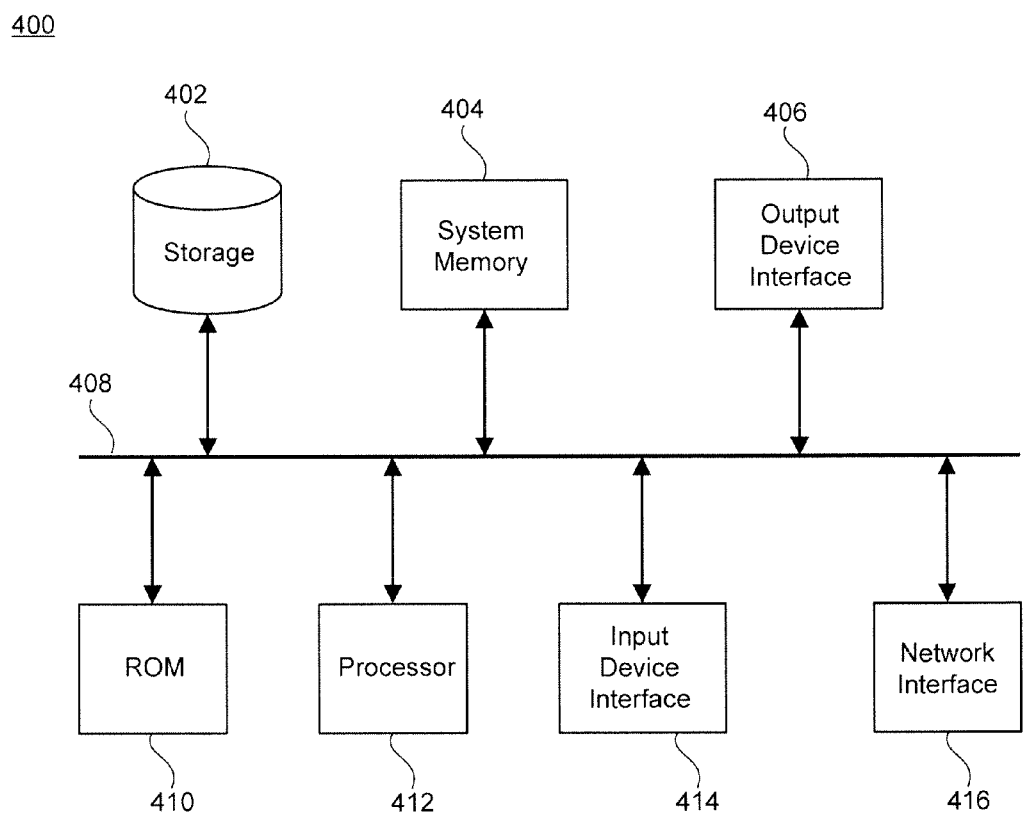
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for automatically determining whether to display and/or highlight social presence annotations according to various embodiments. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touch-screen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for displaying social presence information associated with content, the method comprising:
   identifying content being provided for display;
   determining an entity associated with the content;
   determining one or more social presence scores for the content based on social activity at one or more pages belonging to the entity at one or more social networking services, the one or more social presence scores being determined based on one or more indications of quantity or quality of the social activity;

determining, based on at least one social presence score of the one or more social presence scores, whether the content should be annotated with social presence information regarding the social activity;

providing the content annotated with the social presence information in a highlighted manner for display when the at least one social presence score exceeds a predetermined threshold score, the social presence information being highlighted to include a specific phrase that points out the significance of a characteristic in the social presence information being highlighted, the specific phrase indicating a popularity of the content with respect to a specified number of a plurality of users; and providing the content for display, independent of the social presence information, when the at least one social presence score does not exceed the predetermined threshold score.

2. The method of claim 1, further comprising:
receiving social presence information for the content; and
using the received social presence information to determine the one or more social presence scores for the content.

3. The method of claim 1, further comprising:
determining if the social presence information should be highlighted based on at least one of the one or more social presence scores; and
providing the social presence information in the highlighted manner if it is determined that the social presence information should be highlighted.

4. The method of claim 1, further comprising:
determining if one or more other content is being provided for display along with the content; and
determining social presence scores for the one or more other content if one or more other content is being provided for display along with the content.

5. The method of claim 4, wherein the determining whether the content should be annotated with social presence information regarding the social activity is further based on one or more of the social presence scores for the one or more other content.

6. The method of claim 4, further comprising:
determining if social presence information should be highlighted based on one or more of at least one of the one or more social presence scores or one or more of the social presence scores for the one or more other content; and
providing the social presence information in the highlighted manner if it is determined that the social presence information should be highlighted.

7. The method of claim 1, wherein the one or more indications of the quality of the social activity comprise quality of the social activity by the entity, relevance of the social activity by the entity to the content or the relevance of the social activity by the entity to a user query relating to the content.

8. The method of claim 1, wherein the one or more indications of the quantity of the social activity comprise one or more of a number of users following the entity, social activity of users with respect to the entity, frequency of posts by the entity, entity level of engagement, entity level of interaction with other users, entity level of responsiveness to other users, or entity popularity on social networking and search services.

9. The method of claim 1, wherein the social activity comprises one or more posts or social interactions with respect to posts.

10. The method of claim 1, wherein providing the content annotated with the social presence information in the highlighted manner further comprises:
providing a graphical icon or representation for display with the social presence information; and
presenting the social presence information in a different manner than other content provided for display.

11. A system for displaying social presence information associated with content, the system comprising:
one or more processors; and
a machine-readable medium comprising instructions stored therein, which when executed by the processors, cause the processors to perform operations comprising:
identifying one or more content items being provided for display, each of the one or more content items being associated with an entity;
for each of the one or more content items, determining one or more social presence scores based on social activity at one or more pages at one or more social networking services belonging to the entity associated with the content item;
determining, for each of the one or more content items, based on at least one social presence score of the one or more social presence scores for the one or more content items, whether social presence information regarding the social activity relating to the content item should be provided for display; and
providing social presence information annotated to each of the one or more content items in a highlighted manner when the at least one social presence score exceeds a predetermined threshold score, the social presence information being highlighted to include a specific phrase that points out the significance of a characteristic in the social presence information being highlighted, the specific phrase indicating a popularity of at least one of the one or more content items with respect to a specified number of a plurality of users; and
providing the one or more content items for display, independent of the social presence information, when the at least one social presence score does not exceed the predetermined threshold score.

12. The system of claim 11, wherein, for each of the one or more content items, determining whether social presence information should be provided is based on one or more social presence scores associated with the content item.

13. The system of claim 11, wherein, for each content item, determining whether social presence information should be provided is based on one or more social presence scores associated with the content item and one or more scores associated with at least one other content item of the one or more content items.

14. The system of claim 11, further comprising:
receiving social presence information for each of the one or more content items; and
using the received social presence information to determine the social presence score for each of the one or more content items.

15. The system of claim 11, further comprising:
determining if the social presence information, of the one or more content items, should be highlighted based at least on the social presence score for the content item; and providing the social presence information for each content item in the highlighted manner if it is determined that the social presence information for the content item should be highlighted.

16. The system of claim 11, wherein the determining for each content item whether the content item should be annotated with social presence information regarding the social activity is further based on one or more scores associated with at least one other content item of the one or more content items.

17. The system of claim 11, wherein the one or more social presence scores for each content item are determined based on one or more indications of quantity of the social activity at the one or more pages.

18. The system of claim 17, wherein the one or more indications of the quantity of the social activity at the one or more pages comprise one or more of a number of users following the entity, social activity of users with respect to the entity, frequency of posts by the entity, entity level of engagement, entity level of interaction with other users, entity level of responsiveness to other users, or entity popularity on social networking and search services.

19. The system of claim 11, wherein the one or more social presence scores for each content item are determined based on one or more indications of quality of the social activity at the one or more pages.

20. The system of claim 11, wherein one or more indications of quality of the social activity at the one or more pages comprise quality of posts and social interactions by the entity, relevance of the posts and social interactions by the entity to the content or the relevance of the posts and social interactions by the entity to a user query relating to the content.

21. A machine-readable medium comprising instructions stored therein, which when executed by a machine, cause the machine to perform operations comprising:

identifying content being provided for display;

determining an entity associated with the content;

identifying social activity with regard to the content at one or more pages belonging to the entity at one or more social networking services, wherein the social activity includes posts and social interactions by the entity;

determining one or more indications of quality of the social activity, wherein the one or more indications of the quality of the social activity comprise quality of the posts and social interactions by the entity, relevance of the posts and social interactions by the entity to the content or the relevance of the posts and social interactions by the entity to a user query relating to the content;

determining one or more indications of quantity of the social activity, wherein the one or more indications of the quantity of the social activity comprise one or more of a number of users following the entity, social activity of users with respect to the entity, frequency of the posts by the entity, entity level of engagement, entity level of interaction with other users, entity level of responsiveness to other users, or entity popularity on social networking and search services;

determining one or more social presence scores for the content based on one or both of the one or more indications of quantity of the social activity or the one or more indications of quality of the social activity;

determining, at least based on the one or more social presence scores, whether the content should be annotated with social presence information regarding the social activity;

determining, at least based on the one or more social presence scores, whether the social presence information should be highlighted;

providing the content for display, independent of the social presence information, when at least one of the one or more social presence scores does not exceed a predetermined threshold score; and annotating the content with the social presence information when each of the one or more social presence scores exceeds the predetermined threshold score, wherein the social presence information is presented in a visually differentiating manner if it is determined that the social presence information should be highlighted, the social presence information being highlighted to include a specific phrase that points out the significance of a characteristic in the social presence information being highlighted, the specific phrase indicating a popularity of the content with respect to a specified number of a plurality of users.

* * * * *